United States Patent [19]
Kluttz

[11] Patent Number: 5,006,638
[45] Date of Patent: Apr. 9, 1991

[54] MELT PROCESSING OF CARBON MONOXIDE/OLEFIN COPOLYMER WITH CARBON DIOXIDE

[75] Inventor: Robert Q. Kluttz, Houston, Tex.

[73] Assignee: Shell Oil Company, Houston, Tex.

[21] Appl. No.: 462,955

[22] Filed: Jan. 8, 1990

Related U.S. Application Data

[63] Continuation of Ser. No. 357,227, May 26, 1989, abandoned.

[51] Int. Cl.[5] .............................................. C08G 67/02
[52] U.S. Cl. .................................... 528/483; 525/539; 528/392; 528/481
[58] Field of Search ........................ 528/483, 481, 392; 525/539

[56] References Cited

U.S. PATENT DOCUMENTS 3,694,412 9/1972 Nozaki .......................... 260/63 CQ
4,791,190 12/1988 Van Broekhoven .............. 528/483

*Primary Examiner*—Harold D. Anderson
*Attorney, Agent, or Firm*—Denise Y. Wolfs

[57] ABSTRACT

Improved melt stability is imparted to a linear alternating polymer of carbon monozide and at least one ethylenically unsaturated hydrocarbon during processing of the polymer when at least one melting and solidification cycle of such processing is conducted in intimate contact with carbon dioxide.

18 Claims, No Drawings

MELT PROCESSING OF CARBON MONOXIDE/OLEFIN COPOLYMER WITH CARBON DIOXIDE

This is a continuation of application Ser. No. 07/357,227, filed May 26, 1989, now abandoned.

FIELD OF THE INVENTION

This invention relates to the processing of linear alternating polymers of carbon monoxide and at least one ethylenically unsaturated hydrocarbon. More particularly, the invention relates to an improvement in melt stability of such linear alternating polymers obtained when carbon dioxide is present during the processing of such polymers by methods which include melting and solidification.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g. peroxy compounds. U.K. 1,081,304 produced similar polymers in the presence of alkylphosphine complexes of palladium salts as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, now becoming known as polyketones or polyketone polymers, has become of greater interest in part because of the greater availability of the polymers. The more recent general processes for the production of the polymers is illustrated by a number of published European Patent Applications including 121,965, 181,014, 224,454 and 257,663. The process generally involves the use of a catalyst composition formed from a salt of a Group VIII metal selected from palladium, cobalt or nickel, the anion of a non-hydrohalogenic acid having a pKa below about 6, preferably below 2, and a bidentate ligand of phosphorus, arsenic or antimony.

The resulting polymers are relatively high molecular weight materials having established utility as premium thermoplastics. They are employed in the production of shaped articles, for example, as containers for food and drink, by methods such as extrusion, injection molding or thermoforming which are conventional for thermoplastics. Although the polyketone polymers process relatively easily with good retention of properties, they do undergo a certain degree of loss of desirable properties when such processing includes one or even more than one cycle of melting and solidification. It would therefore be of advantage to provide a method by which such loss of desirable properties is minimized and an improved melt stability is observed during the melt-/solidification processing of the polyketone polymers.

SUMMARY OF THE INVENTION

The present invention provides a method for improving the melt stability of linear alternating polymers of carbon monoxide and at least one ethylenically unsaturated hydrocarbon during the processing of such polymers by procedures which include one or more melting-/solidification cycles. More particularly, the invention provides a process for providing the improved melt stability by contacting the polymers during the processing with carbon dioxide.

DESCRIPTION OF THE INVENTION

The polymers to which improved melt stability is provided according to the invention are linear alternating polymers of carbon monoxide and at least one ethylenically unsaturated hydrocarbon. The ethylenically unsaturated hydrocarbons which are useful as precursors of the linear alternating polymers have up to 20 carbon atoms inclusive, preferably up to 10 carbon atoms, and are aliphatic such as ethylene and other α-olefins including propylene, 1-butene, isobutylene, 1-hexene, 1-octane and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstryene. Preferred polymers are copolymers of carbon monoxide and ethylene or terpolymers of carbon monoxide, ethylene and a second hydrocarbon of at least 3 carbon atoms, particularly an α-olefin such as propylene.

When the preferred terpolymers of carbon monoxide, ethylene and a second hydrocarbon are to be employed in processing according to the invention, there will be at least about 2 units incorporating a moiety of ethylene for each unit incorporating a moeity of the second hydrocarbon. Preferably there will be from about 10 to about 100 units incorporating a moiety of ethylene for each unit incorporating a moiety of the second hydrocarbon. The polymer chain of the preferred polymers is therefore represented by the repeating formula

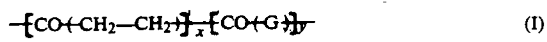

$$-\!\!\left[CO\!-\!(CH_2-CH_2)\right]_x\!\left[CO\!-\!(G)\right]_y\!\!- \quad (I)$$

wherein G is the moiety of the second hydrocarbon polymerized through the ethylenic unsaturation. The $-CO-(CH_2-CH_2)-$ units and the $-(G)-$ units are formed randomly throughout the polymer chain and the ratio of y:x is no more than about 0.5. In the modification where copolymers of carbon monoxide and ethylene without the presence of the second hydrocarbon are processed according to the invention, the copolymer is represented by the above formula I wherein y is 0. When y is other than 0, i.e., terpolymers are processed, the preferred ratio of y:x is from about 0.01 to about 0.1. The end groups or "caps" of the polymer chain will depend upon what materials are present during polymerization and how or whether the polymer was purified. The end groups are of little significance so far as the overall properties of the polymers are concerned so that the polymer is fairly represented by the polymer chain as depicted above.

Of particular interest are the polymers of the above formula having a molecular weight of from about 1000 to about 200,000, especially those of number average molecular weight of from about 20,000 to about 90,000 as determined by gel permeation chromatography. The physical properties of the polymer will depend in part on the molecular weight, whether the polymer is a copolymer or a terpolymer and, in the case of terpolymers, the nature of and the proportion of the second hydrocarbon present. Typical melting points for such polymers are from about 175° C. to about 300° C., but more often are from about 210° C. to about 270° C. The polymers will have a limiting viscosity number (LVN); measured in m-cresol at 60° C., of from about 0.4 dl/g to about 10 dl/g, but preferred are those having an LVN of from about 0.8 dl/g to about 4 dl/g.

The polyketone polymers are produced by the general methods of the above published European Patent Applications. Although the scope of the polymerization is extensive, a preferred catalyst composition is formed from a palladium salt, particularly a palladium alkanoate such as palladium acetate, an anion of trifluoroacetic acid or p-toluenesulfonic acid and a bidentate ligand of phosphorus such as 1,3-bis(diphenylphosphino)propane or 1,3-bis[di(Z-methoxyphenyl)phosphine]propane. The carbon monoxide and hydrocarbon are contacted under polymerization conditions in the presence of the catalyst and a reaction diluent. Lower alkanols such as methanol, ethanol and propanol are satisfactory as the diluent, methanol is preferred. Typical polymerization conditions include a polymerization temperature of from about 35° C. to about 150° C. and a pressure of from about 10 bar to about 200 bar. The polyketone polymer is generally obtained as a suspension in the reaction diluent and is recovered by conventional methods such as filtration or decantation. The polyketone polymer is employed as such or is purified, if desired, by contact with a solvent which is selective for the catalyst residues.

The improvement in melt stability is imparted to the polyketone polymers by intimate contact with carbon dioxide during at least one cycle of melting and solidification (crystallization) undergone by the polyketone polymer subsequent to the production of the polyketone polymer. The improvement in melt stability is manifested by retention of crystallinity of the polyketone polymer as measured by any of a number of methods designed to determine physical properties of the polymer which are dependent upon or relate to the crystallinity of the polymer. For example, the polyketone polymer will exhibit a more constant melting point and/or crystallization temperature during the first but also during subsequent melting and crystallization. The same effect will be observed for the heats of melting and also the heats of crystallization of the polyketone polymer during the first but also subsequent melting and solidification. A reduction in crosslinking evidenced by a reduced rate of viscosity increase is also observed during rheometric evaluation in which the polymer is heated to its melting point and subjected to shear.

The role of carbon dioxide in providing melt stability to the polyketone polymer in melting and solidification cycles is not completely understood. It does not appear to be acting as a lubricant since feed rates during extrusion and initial viscosity measurements are not affected. The carbon dioxide probably acts as a buffer to inhibit acid and base catalyzed crosslinking reactions in the polyketone. This buffering capability of carbon dioxide, bicarbonate salts, and carbonate salts in aqueous solution is broadly well known, but not the ability of very small amounts of carbon dioxide to buffer a system at elevated temperatures in the presence of only traces of water. An additional benefit is the longevity of the stabilizing effect. Carbon dioxide is a volatile gas and would be expected to rapidly diffuse out of the polyketone. Nevertheless, polyketones extruded under an atmosphere of carbon dioxide exhibit improved melt stability in subsequent melt processing steps even when these melt processing steps are conducted at a much later time. Polyketones are subject to high temperature oxidation, and some benefit is expected from simply excluding oxygen during a melt processing step. Indeed, an improvement is observed when a melt processing step is performed under a nitrogen blanket. The presence of carbon dioxide, however, imparts an additional improvement in melt stability beyond that observed with a nitrogen blanket so that the stabilizing effect of carbon dioxide cannot totally be attributed to simple exclusion of oxygen.

The precise method of contacting the polyketone polymer and the carbon dioxide is not material so long as the polymer is maintained in a carbon dioxide environment during at least one melt processing step. The quantity of carbon dioxide in the environment may be varied from 0.% to 100% of the blanketing atmosphere. Additional carbon dioxide may be introduced into the polymer by operating in an atmosphere of carbon dioxide at elevated pressure, but the benefit is realized by operating at standard pressure. In one modification, the polymer is blanketed with carbon dioxide as by operating an extruder through which the polymer is processed in a gaseous carbon dioxide atmosphere. In an alternate modification, carbon dioxide is provided in a solid form, i.e., dry ice, which, in a finely divided form, is mixed with the polymer prior to or during the processing. The vaporization of the dry ice during heating will provide the necessary carbon dioxide environment and the resulting improvement in melt stability. The contacting with carbon dioxide in the first melting/solidification cycle is useful to impart the initial melt stability which persists after the initial cycle has been completed. It is also useful, if desired, to provide a carbon dioxide environment in subsequent melting and solidification cycles in order to maintain the melt stability initially provided. It is also possible to provide the carbon dioxide environment in a second melting/solidification cycle for a given polyketone polymer when the carbon dioxide was not present in the initial cycle. In such an embodiment the provision of carbon dioxide will not, of course, provide melt stability to the first melting and solidification but would retard further loss of melt stability in subsequent cycles. In terms of the invention as described above, the initial cycle would be considered to be the first cycle at which the carbon dioxide is provided, with the provision of the carbon dioxide serving to result in improved melt stability as compared to the properties of the polymer when the carbon dioxide is first provided.

The particular quantity of carbon dioxide to be employed is not critical although preferably sufficient carbon dioxide is provided to ensure that the polyketone polymer is intimately contacted with carbon dioxide while molten during the melting/solidification cycle. This intimate contact may be achieved by use of a blanketing atmosphere containing from about 0.1% to 100% carbon dioxide, but preferably the blanketing atmosphere is from about 5% to 100% carbon dioxide. Alternatively, dry ice may be added t° the polyketone polymer prior to or during melt processing to achieve the same environment. Any excess of carbon dioxide is not detrimental because it will diffuse away from or out of the polymer subsequent to the completion of the melting/solidification. It is in part because of this latter :feature that the use of carbon dioxide is so advantageous. Use of carbon dioxide does not add additional materials to the polymer which could cause a decrease in the desirable properties of the polyketone polymer or difficulties in obtaining governmental approval for food-grade polymer.

The polyketone polymer to which melt stability has been imparted shows particular advantages when the polymer is processed by multiple melting and solidification cycles to produce a shaped article which is likely to be exposed to elevated temperature, such as, for example, a container for food or drink. By way of a specific example, a polyketone polymer is often compounded with stabilizers, colorants, reinforcements and other additives by passage through an extruder to form the polymer composition as extrudate in the physical form of nibs. The nibs are subsequently used in an injection molding apparatus to produce the shaped article. Use of the process of the invention during the extrusion imparts melt stability not only to the nibs but also to the shaped article. While the process of the invention provides advantages when the polyketone polymer is processed by methods which do not include melting and solidification, the advantages are most apparent when multiple melting/solidification procedures are involved in the processing of the polyketone polymer.

The invention is further illustrated by the following Illustrative Embodiments which should not be construed as limiting the invention.

ILLUSTRATIVE EMBODIMENT I

A linear alternating terpolymer of carbon monoxide, ethylene and propylene was produced employing a catalyst formed from palladium acetate, triflouroacetic acid and 1,3-bis[di(2-methoxyphenyl)phosphino]propane. This terpolymer had a melting point of 223° C. and an LVN, measured in m-cresol at 60° C., of 1.79 dl/g. This polymer is termed Polymer A in the Illustrative Embodiments which follow. Using a similar catalyst formed from the same components, a second terpolymer was formed which had a melting point of 219 ° C. and an LVN, measured at 60° C. in m-cresol, of 1.72 dl/g. This terpolymer is termed Polymer B. A third terpolymer was produced by employing a similar catalyst formed from the same components which had a melting point of 226° C. and an LVN, measured in m-cresol at 60° C. of 1.62 dl/g. This terpolymer is termed Polymer C. A fourth terpolymer was produced employing a similar catalyst formed from the same components. This terpolymer had a melting point of 223° C. and an LVN, measured in m-cresol at 60° C., of 1.81 dl/g. This terpolymer is termed Polymer D. A fifth terpolymer was produced employing a similar catalyst formed from the same components. This terpolymer had a melting point of 222° C. and a LVN, measured in m-cresol at 60° C., of 1.87 dl/g. This terpolymer is termed Polymer E. A sixth terpolymer was produced employing a similar catalyst formed from the same components. This terpolymer had a melting point of 221° C. and a LVN, measured in m-cresol at 60° C., of 1.76 dl/g. This terpolymer is termed Polymer F.

ILLUSTRATIVE EMBODIMENT II

Samples of terpolymers A, B, and C of Illustrative Embodiments I were extruded in air, under a blanket or carbon dioxide, and with crushed dry ice added during the extrusion. The extruder was a 15 mm Baker-Perkins twin screw operating at 240° C. The nibs from the extruder were compression molded into 30 mil plaques for rheology measurements.

As a measure of the melt stability of the polymer samples, the dynamic viscosity was measured. An increase in viscosity is indicative of crosslinking and is a measure of melt stability. A higher rate of viscosity increase in indicative of poor melt stability. A decrease in the rate of viscosity increase constitutes an improvement in melt stability. The dynamic viscosity was measured at 275° C. on a parallel plate Rheometrics apparatus at a shear rate of 1.0 radian/second at 25% strain. The results are shown in the Tables which follow.

TABLE A

| Polymer A Processing Conditions | Rate of Viscosity Increase (Pascal seconds per minute) |
|---|---|
| Air | 1300 |
| $CO_2$ Blanket | 1250 |
| Dry Ice Added | 1050 |

TABLE B

| Polymer B Processing Conditions | Rate of Viscosity Increase (Pascal seconds per minute) |
|---|---|
| Air | 3000 |
| Dry Ice Added | 1600 |

TABLE C

| Polymer C Processing Conditions | Rate of Viscosity Increase (Pascal seconds per minute) |
|---|---|
| Air | 2700 |
| $CO_2$ Blanket | 2100 |
| Dry Ice Added | 1400 |

ILLUSTRATIVE EMBODIMENT III

Samples of terpolymers D, E, and F of Illustrative Embodiment I were compression molded into 30 mil plaques. These plaques were measured for melt stability as described in Illustrative Embodiment II. In one set of experiments, the rheology test was blanketed with nitrogen while in the second set of experiments the rheology test was blanketed with carbon dioxide. The results are shown in the Tables which follow.

TABLE D

| Polymer D Rheology Test Conditions | Rate of Viscosity Increase (Pascal seconds per minute) |
|---|---|
| $N_2$ Blanket | 352 |
| $CO_2$ Blanket | 214 |

TABLE E

| Polymer E Rheology Test Conditions | Rate of Viscosity Increase (Pascal seconds per minute) |
|---|---|
| $N_2$ Blanket | 302 |
| $CO_2$ Blanket | 258 |

TABLE F

| Polymer F Rheology Test Conditions | Rate of Viscosity Increase (Pascal seconds per minute) |
|---|---|
| $N_2$ Blanket | 271 |
| $CO_2$ Blanket | 196 |

What is claimed is:

1. A process for improving the melt stability of a linear alternating polymer of carbon monoxide and at least one ethylenically unsaturated hydrocarbon by contacting the polymer with an atmosphere containing 0.1% to 100% carbon dioxide during at least one melt processing step, and subsequently solidifying the polymer.

2. The process of claim 1 wherein the polymer is represented by the repeating formula $$-[CO-(CH_2-CH_2)]_x-[CO-(G)]_y-$$

wherein G is a moiety of an ethylenically unsaturated hydrocarbon of at least 3 carbon atoms polymerized through the ethylenic unsaturation and the ratio of y:x is no more than about 0.5.

3. The process of claim 2 wherein y is 0.

4. The process of claim 2 wherein G is a moiety of propylene.

5. The process of claim 4 wherein the ratio of y:x is from about 0.01 to about 0.1.

6. A process for improving the melt stability of a linear alternating polymer of carbon monoxide and at least one ethylenically unsaturated hydrocarbon by contacting the polymer with an atmosphere containing 5% to 100% carbon dioxide during at least one melt processing step, and subsequently solidifying the polymer.

7. The process of claim 6 wherein the polymer is represented by the repeating formula $$-[CO-(CH_2-CH_2)]_x-[CO-(G)]_y-$$

wherein G is a moiety of an ethylenically unsaturated hydrocarbon of at least 3 carbon atoms polymerized through the ethylenic unsaturation and the ratio of y:x is no more than about 0.5.

8. The process of claim 7 wherein y is 0.

9. The process of claim 7 wherein G is a moiety of propylene.

10. The process of claim 9 wherein the ratio of y:x is from about 0.01 to about 0.1.

11. The process of claim 14 wherein the melt processing step occurs in an extruder wherein the polymer is contacted with a gaseous carbon dioxide atmosphere containing 5% to 100% carbon dioxide.

12. The process of claim 11 wherein the carbon dioxide is present at elevated pressure.

13. The process of claim 6 wherein the polymer is contacted with carbon dioxide by mixing dry ice with the polymer.

14. A process for improving the melt stability of a linear alternating polymer of carbon monoxide at least one ethylenically unsaturated hydrocarbon by blanketing the polymer with an atmosphere containing 5% to 100% carbon dioxide during at least one melt processing step.

15. The process of claim 14 wherein the polymer is represented by the repeating formula $$-[CO-(CH_2-CH_2)]_x-[CO-(G)]_y-$$

wherein G is a moiety of an ethylenically unsaturated hydrocarbon of at least 3 carbon atoms polymerized through the ethylenic unsaturation and the ratio of y:x is no more than about 0.5.

16. The process of claim 15 wherein y is 0.

17. The process of claim 15 wherein G is a moiety of propylene.

18. The process of claim 17 wherein the ratio of y:x is from about 0.01 to about 0.1.

* * * * *